Jan. 22, 1957  J. F. SHEAHAN  2,778,800
OZONE FAUCET
Filed June 11, 1953  2 Sheets-Sheet 1
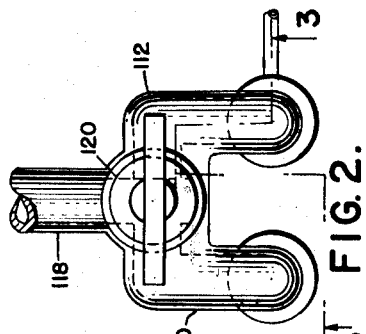
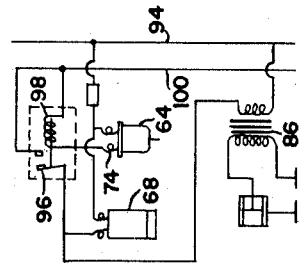
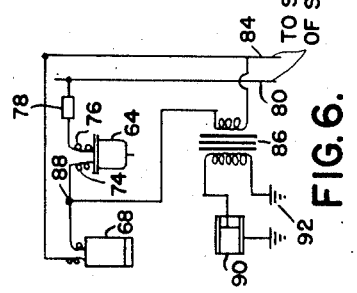
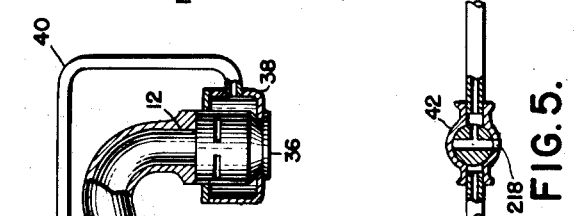
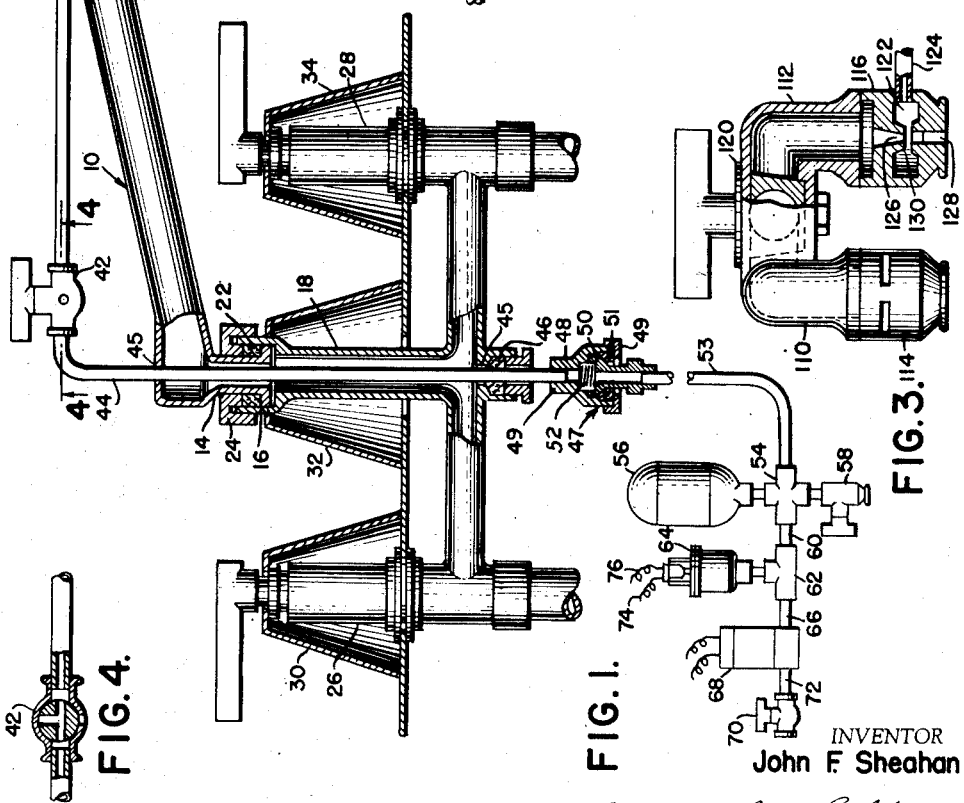
INVENTOR
John F. Sheahan
BY
ATTORNEYS

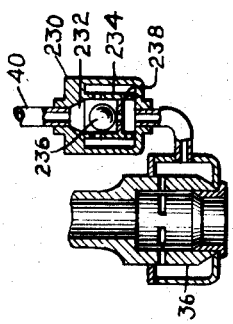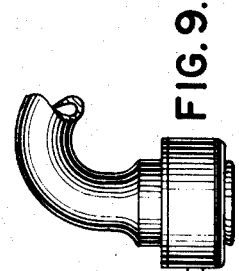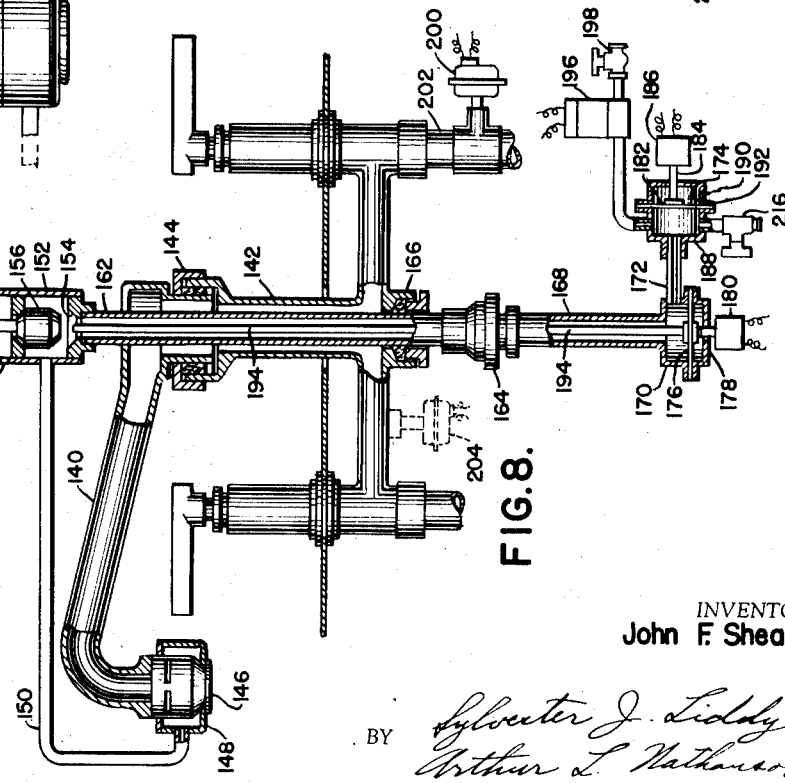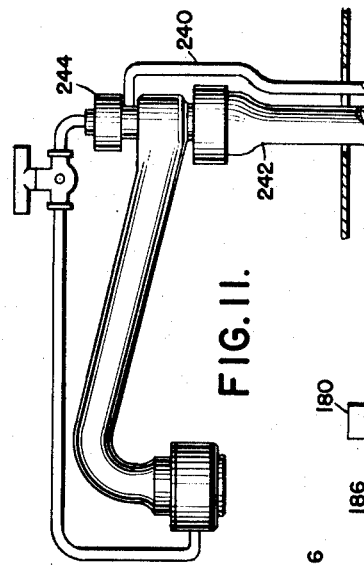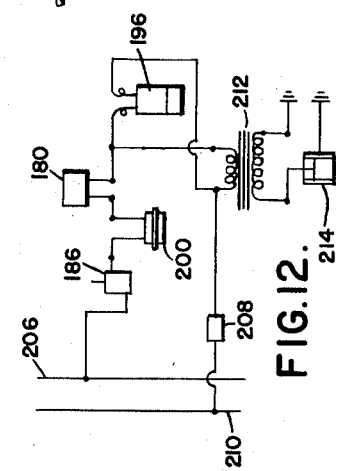

United States Patent Office 2,778,800
Patented Jan. 22, 1957

2,778,800
OZONE FAUCET

John F. Sheahan, Scottdale, Pa.

Application June 11, 1953, Serial No. 360,964

5 Claims. (Cl. 210—27)

This invention relates to ozone apparatus and in particular to ozone faucet construction and apparatus associated therewith. Particularly in farm communities and other rural districts it is common for each individual to have his own water supply, such as a well. For many years ozone type purifiers have been utilized with such individual water systems. Ozone purifiers are also used where a central water supply exists, but where no purification apparatus is provided by the water supplier. Another instance in which ozone purifiers for water are used is in localities where quite often there is a need for additional purification of water. On many occasions water supplied by municipalities does not meet standards of purification due to floods, poor mains and similar conditions. Yet another instance in which ozone purification can be utilized at the site of use of the water is in those instances in which although the water is of sufficient purification it has a very disagreeable odor or taste. Ozone is a powerful oxidizing agent. It is possible in many instances to remove chlorine or medicinal flavors from city drinking water as well as purify water which is not up to standard through the use of ozone purifiers.

Many types of ozone apparatus have been devised. However, all prior devices have been objectionable and principally because of the large size and appearance of the equipment. I have been a designer of ozone equipment for many years and am aware that the necessity of mounting a unit in full view over a kitchen sink, or the necessity of using exposed pipes and exposed electrical wiring has often times made it objectional to install ozone purifying equipment. It is, therefore, an object of my invention to provide ozone equipment which may be concealed such as in cabinet bases and which need not be mounted overhead, or otherwise exposed.

It is a further object of my invention to provide ozone equipment which can be installed as simply as installing a new faucet, for example, thus obviating the necessity for structural modification of sinks or surrounding equipment, etc. With my invention it is possible to place all equipment in a basement other than the faucet which forms a part of the invention.

These and other objects and advantages will appear from the following description and the accompanying drawings in which:

Figure 1 is a vertical view partly in section of ozone apparatus constructed in accordance with my invention;

Figure 2 is a plan view showing a modification which can be made in the ozone purifier of Fig. 1;

Figure 3 is an end elevational view taken along line 3—3 of Fig. 2;

Figure 4 is a sectional view taken along line 4—4 of Fig. 1 and illustrating a valve forming a part of the invention;

Figure 5 is a sectional view similar to Fig. 4, but showing the valve in a different operating position;

Figure 6 shows a wiring diagram for controlling operation of the ozone purifier illustrated in Fig. 1;

Figure 7 shows a modified form of wiring diagram for the ozone purifier of Fig. 1;

Figure 8 is an elevational view partly in section illustrating a modified form of ozone purifier constructed in accordance with the invention;

Figure 9 is a fragmentary view of a portion of the modified form shown in Fig. 8;

Figure 10 is a view showing a portion of another modified form of control element forming part of my invention;

Figure 11 is an elevational view of yet another form which my invention can take;

Figure 12 is a view of an electric circuit which can be used with the ozone purifier illustrated in Fig. 8.

Similar reference characters in the several figures represent similar elements.

Referring now particularly to the drawings, Figure 1 illustrates a swivel type faucet 10 having a depending nozzle 12 and a depending intake conduit 14. The conduit 14 is received within a connecting flange 16 of T conduit 18. The usual packing or washer 22 and collar 24 are utilized to effect a water tight connection, yet permit swivelling of faucet 10. Hot and cold water faucets 26 and 28 are connected to the T 18. Decorative housings 30, 32 and 34 may be utilized. An aerator 36 which may be of any of the types now known is attached to nozzle 12. A housing 38 substantially surrounds the aerator and is attached to nozzle 12. Conduit 40 extends from the housing 38 to spigot valve 42. The housing 38 forms a closed chamber with the aerator surrounding the air inlets of the aerator. Spigot valve 42 has its inlet side connected to conduit 44 which extends downwardly through an opening 45 and a packing 46 to a swivel connection 47. Swivel connection 47 comprises a housing 48, a flange or cover 49, ball swivel 50, mating washer 51 and spring 52. A third conduit 53 extends from the swivel connection to coupling 54. Coupling 54 has a leg connected to a vacuum chamber 56, a leg connected to drain valve 58 and a fourth leg connected to conduit 60 which is in turn connected to T. T 62 has one leg connected to vacuum switch 64 and another leg connected to conduit 66. Conduit 66 connects to the solenoid valve 68. Metering valve 70 is connected to solenoid valve 68 by conduit 72. The metering valve is in turn adapted to be connected to a source of ozone such as a pressurized cylinder. It is seen that either the hot or cold water faucets, or both, can be turned on and water will go through the faucet in the normal manner. No water can escape around conduit 44 since the conduit can be welded or brazed to the faucet. Whenever it is desired to use ozone, valve 42 can be rotated from the position which is shown in Fig. 5 to the position shown in Fig. 4. When the valve is positioned as shown in Fig. 4, the flow of water through nozzles and aerator will create a vacuum in lines 40, 44, 53 and 60, as well as in chamber 56. This is only true, however, if drain 58 is closed. If drain 58 were open to the atmosphere there would be very little reduction in pressure in conduit 44, etc. When the pressure in conduit 60 is reduced sufficiently the vacuum switch 64 will close shunting leads 74, 76.

The vacuum switch 64 is constructed so that when a reduction of pressure occurs in lines 40, 44, 53 and 60 the vacuum switch will operate to shunt lines 74 and 76. Solenoid valve 68 is so constructed that when its operating coil is energized it will open. Of course metering valve 70 may be set in any desired position to meter the flow of ozone into conduit 40 whenever a vacuum exists in the latter conduit.

Figure 6 illustrates one form of wiring circuit which may be employed. As shown lead 76 of the vacuum switch 64 is connected to a fuse 78 which is in turn connected to one side 80 of power source 82. Lead 74 is in turn connected to one lead of the solenoid valve 68. The other lead of 68 is connected to the other side 84 of the power supply. It is seen that when switch 64 closes solenoid valve 68 will operate. Figure 6 also shows a transformer 86 having one side of its primary wiring connected to lead 74, as shown at 88 and has its other side connected to line 84. The secondary of the transformer is connected to an ozone generator 90 and to ground 92. When switch 64 operates the ozone generator is placed in operation. From the above it appears that when valve 42 is operated to position its conduits in the position illustrated in Fig. 4 vacuum switch 64 will operate. When drain cock 58 is closed, solenoid valve 68 will operate to connect conduit 72 to conduit 66 and the ozone generator equipment will be placed in operation. This will cause a supply of ozone to be drawn into the aerator 36. The amount of ozone which is drawn in is governed by the rate of flow of water, by the opening of valve 42 and by the position of meter valve 70. The meter valve 70 is used to control the maximum amount of ozone which will be supplied and valve 42 is used to regulate the actual amount supplied.

Figure 7 shows an alternative form of electrical circuit which may be utilized. As illustrated solenoid 68 is connected directly to line 94 and to one contact of relay 96. The primary transformer 86 is also connected to the same contact of relay 96. To energize solenoid valve 68 and transformer 86 it is necessary to close the relay contacts of relay 96. In order to accomplish such operation lead 74 of vacuum switch 64 is connected to operate the coil 98 of relay 96 and the operating coil has one leg connected to line 100. When vacuum switch 64 closes relay contacts 96 will close, and the transformer 86 and solenoid valve 68 will be energized.

Figures 2 and 3 illustrate a modified form of the construction. As shown the faucet is provided with two nozzle legs 110 and 112. Nozzle leg 110 is provided with an aerator 114, whereas nozzle leg 112 has attached thereto a jet type ozone injector, or an injector type ozone mixer 116. A valve of the pet cock type is provided at the point of juncture with leg 110 and 112. As will be understood by those skilled in the art valve 120 can be formed to make it possible to divert the flow of water from faucet 118 to leg 110 or 112, or cause the water to flow to both legs of the faucet. The valve itself can be constructed to operate identically with the valves shown in Figures 4 and 5. The jet type injector comprises a chamber 122 connected to ozone conduit 124 which can in turn be connected to a valve such as 42, a conduit such as 44, and an injector nozzle or jet 126. When water flows through jet 126 into outlet nozzle 128 it will pass across the opening 130 and cause injection of ozone into the stream of water. Conduit 124 may be connected to ozone apparatus of the type illustrated in Fig. 1. When liquid flows through conduit 110, aerator 114 receives its air directly from the atmosphere. Injector 116 may be used with the devices of Fig. 1 or 8.

Figure 8 illustrates yet another modification of ozone faucet and apparatus. As illustrated faucet 140 is connected to T 142 at 144. The nozzle of the faucet is provided with an aerator 146 and a housing 148 is connected to conduit 150. The above construction is similar to that of elements 36, 38, and 40 of Fig. 1. Conduit 150 is connected to a valve housing 152 having an inlet port 154 adapted to be normally closed by valve 156. Valve 156 has an operating handle 158 and has threaded engagement with housing 152 as shown at 160. Housing 152 is connected to conduit 162 which extends downwardly through faucet 140 and T 142 to a swivel joint 164 which may be of any desirable construction, such as swivel joint 47. A packing 166 seals the opening for conduit 162 at the lower end of T 142. At its upper end conduit 162 is fixedly and hermetically sealed to faucet 140. A conduit 168 which is an extension of conduit 162 extends from coupling 164 to a housing 170 which is in turn connected by conduit 172 to yet another housing 174. A diaphragm 176 is mounted transversely of housing 170 and is connected to operating stem 178 and switch 180. Switch 180 has its contacts made so that when diaphragm 176 extends laterally across the housing 170 the switch contacts will be closed, but when the diaphragm 176 is moved downwardly, as viewed in Fig. 8, the switch contacts will open.

Diaphragm 182 extends laterally across housing 174 and is connected to an operating rod 184 of switch 186. When diaphragm 182 extends laterally across housing 174 the switch contacts in switch 186 are open. However, when diaphragm 182 moves to the left, as viewed in Fig. 8, the switch contacts of switch 186 will close. Both diaphragm 176 and diaphragm 182 are constructed so as to normally extend laterally across their respective housings. Diaphragm 182 is flexible enough to move to the left as viewed in Fig. 8, upon a reduction of pressure in chamber 188. Housing 174 is provided with an opening 190 for admitting atmospheric pressure into chamber 192. Conduits 162 and 168 are of sufficient size to accommodate an operating rod 194 and yet permit an adequate flow of ozone. Operating rod 194 extends from diaphragm 176 to the inner valve seat 154 when valve 156 is in the position shown. It is seen that when valve 156 is moved downwardly it will contact operating rod 194 and move diaphragm 176 downwardly, thus opening the contacts in switch 180. Operating rod 194 may be suitably guided in conduits 162 and 168. Chamber 188 is connected to a solenoid valve 196 which is in turn connected to a metering valve 198. A switch 200 is connected into the cold water line 202. Switch 200 is constructed so as to have its contacts close upon decrease in pressure in the cold water supply tap 202. As an alternative to switch 200, switch 204 which operates when pressure increases may be placed in T 142. Figure 12 illustrates the wiring diagram for the ozone apparatus of Fig. 8. As shown switch 186 has one side connected to line 206 and is connected in series with switches 200, 180, solenoid valve 196, fuse 208 and the other side of line 210. It is understood that switch 204 may be substituted for switch 200. A transformer 212, similar to transformer 86 has a primary connected across or in parallel with solenoid valve 196. The secondary of the transformer is connected to the ozone generating apparatus 214. It is seen that solenoid valve 196 and ozone generating apparatus 214 will operate when switches 180, 186 and 200 are closed. Such an arrangement insures that ozone will be supplied only when desired. If one of the faucets is not turned on ozone will not be supplied to the faucet when valve 156 is open, nor will ozone be supplied with one of the faucets turned on if valve 156 is not open. Drain cocks 58 and 216 are provided for draining water from the ozone supply circuits.

If for any reason water should enter the conduits 162 or 44 the vacuum would be broken and shut down the ozone apparatus. The closing of solenoid valves 68 and 196 would shut off the ozone supply apparatus. Also with the device illustrated in Fig. 8 switch 186 would open as soon as it was acted on by the water pressure. Switch 186 is a safety switch intended to open from the weight of the column of liquid in conduit 168, in the event liquid backs up into the ozone conduit. The opening of this switch would of course close solenoid valve 196 thereby protecting all equipment beyond. Diaphrams 176 and 182 are both spring loaded in that they tend to assume a position extending laterally of their housings. Switch 180 would probably not operate under the influence of water since it has a stiffer operating diaphragm 176 in order to support the operating rod 194. Valve 42 (see Figs. 4 and 5) and valve housing 152 are each provided with air inlet openings 218 and 220 respectively. When valve 42 is positioned, as shown in Fig. 5, air will be supplied to aerator 36 through the opening 218. Also when valve 156 is closed against its valve seat 154 air will be supplied through opening 220 to aerator 146. Thus, the aerators will function even when ozone is not being supplied.

Figure 9 merely shows, in elevation, the outer appearance of the aerator and housing assemblies 36 and 38 or 146 and 148.

Figure 10 shows a ball check valve device which may be used to prevent liquid from backing up into the conduits carrying ozone. The ball check valve comprises a housing 230 having a ball seat 232, a ball cage 234 and a ball 236 retained within the cage. The ball cage has openings 238 extending therethrough. It is obvious that ball check valve 230 may be inserted in line 40 or line 150. When ozone or air is being supplied to the aerator 36 or 146 the ball will be in the position illustrated. However, should liquid back up through the aerator and surround the housing the ball 236 will seat at 232. The ball check valve will forestall the necessity of having to frequently open drains 58 or 216. Liquid which would get by the ball check valves would be stopped by the solenoid valve. Such liquid will not enter the ozone conduit while the device is in operation but only at times of starting or stopping the flow of liquid.

The solenoid valve acts in a dual capacity. When the device is inoperative it keeps the ozone conductor closed so that when liquid flows through the aerator, that is, when the device is made operative, the pressure in the ozone conductor is reduced more rapidly thereby enabling vacuum switch 64 to operate in a more positive and rapid manner. The second duty of the solenoid valve is, of course, as described above, that is, to prevent liquid from entering the ozone generating or supplying equipment.

Figure 11 shows yet another modified form of ozone faucet in which conduit 240 extends up along the side of the connector 242 to a swivel type connection 244. The swivel type connection may be similar to connection 47 or 164.

It will be understood that ozone generators 86 and 214 may be deleted if ozone is available in tanks or similar containers.

While I have shown and described a preferred form of my invention, it will be understood that variations in details of form may be made without departure from the invention as defined in the appended claims.

I claim:

1. Liquid treating apparatus comprising a T fitting having two inlet legs and one outlet leg and means for supplying water to said outlet leg including valves, and a spout swivelly connected to the outlet leg of said fitting, an aerator mounted on the discharge end of said spout, a housing substantially surrounding said aerator, said housing forming a chamber enclosing the air inlet openings of said aerator, a first conduit extending from said housing along the side of said spout downwardly through an opening in said spout and extending through said T fitting, packing means rotatably connecting said conduit to said T fitting, a second conduit, a swivel connection connecting said first conduit to said second conduit, a switch normally inoperative and connected to said second conduit, but being constructed to be operable upon a reduction of pressure in said last named conduit, said switch serving to initiate a supply of ozone to said second conduit for discharge through said aerator into a stream of liquid being supplied through said faucet upon reduction of pressure in said second conduit.

2. Liquid treating apparatus comprising a T fitting, a faucet spout connected to said T fitting, valves for controlling the supply of water to said faucet spout, an aerator having inlet openings connected to the discharge end of said faucet, a housing surrounding said aerator so as to enclose the air inlet openings of said aerator, said housing being in sealed relationship with said aerator, a conduit leading from said housing, a valve mounted in said conduit, said valve being operable to admit air into said conduit and being operable to prevent the admission of air into said conduit and connect said conduit to a second conduit, said second conduit extending downwardly through means providing an opening in said faucet spout and through said T fitting and being rotatably connected to said fitting, switch means connected to the first mentioned conduit and operable upon reduction of pressure in said conduit to initiate the supply of ozone to said conduit.

3. Liquid treating apparatus comprising a conduit adapted to be connected to a means for supplying ozone, a switch mounted in said conduit and operable upon reduction of pressure therein, a valve normally closing said conduit and operable upon operation of said switch to open said conduit, said conduit being connected to a faucet by means of a chamber mounted at the discharge end of said faucet so as to surround a stream of liquid being supplied through said faucet, said switch being operable upon reduction of pressure in said conduit under the influence of a stream of liquid being supplied through said faucet, and a second valve mounted in said conduit and operable to supply air into said conduit to maintain said switch inoperative when liquid is being discharged through said faucet, said valve being operable to cut off the supply of air to said conduit to render said switch operable upon reduction of pressure in said conduit.

4. Liquid treating apparatus comprising, a faucet spout, a conduit means for connecting said conduit to a source of ozone, an injector connected to said faucet to receive liquid therefrom, said conduit being connected to said injector for the injection of ozone into liquid discharged from said faucet spout, a switch mounted in said conduit and operable by reduction of pressure therein, a valve normally closing said conduit and operable by operation of said switch to open said conduit, said switch being operable by reduction of pressure in said conduit under the influence of a stream of liquid being supplied through said faucet, and a second valve mounted in said conduit and operable to supply air into said conduit to maintain said switch inoperative when liquid is being discharged through said faucet, said valve being operable to cut off the supplying of air to said conduit to render said switch operable upon reduction of pressure in said conduit.

5. Liquid treating apparatus comprising a T fitting, a faucet spout connected to said T fitting, valves for controlling a supply of water to said faucet spout, an aerator having air inlet openings connected to the discharge end of said faucet spout, a housing surrounding said aerator so as to enclose the air inlet openings of said aerator, said housing being in sealed relationship with said aerator, a conduit leading from said housing, a valve mounted in said conduit, said valve being operable to admit air into said conduit and being operable to prevent the admission of air into said conduit and connect said conduit to a second conduit, said second conduit extending downwardly through means providing an opening in said faucet spout and through said T fitting and being rotatably connected to said fitting means for connecting said second conduit to a supply of ozone.

References Cited in the file of this patent

UNITED STATES PATENTS

| | | |
|---|---|---|
| 1,000,206 | Spurge | Aug. 8, 1911 |
| 1,044,653 | Held | Nov. 19, 1912 |
| 1,065,246 | Held | June 17, 1913 |
| 1,090,044 | Fuss | Mar. 10, 1914 |
| 1,264,360 | Begot | Apr. 30, 1918 |
| 1,613,998 | Hartman | Jan. 11, 1927 |
| 1,788,500 | Uhri | Jan. 13, 1931 |
| 2,302,097 | Beckman | Nov. 17, 1942 |
| 2,549,012 | Robinson | Apr. 17, 1951 |
| 2,643,104 | Holden | June 23, 1953 |